July 31, 1973 R. M. BERG 3,749,625
MACHINING PROCESS
Filed Aug. 12, 1971
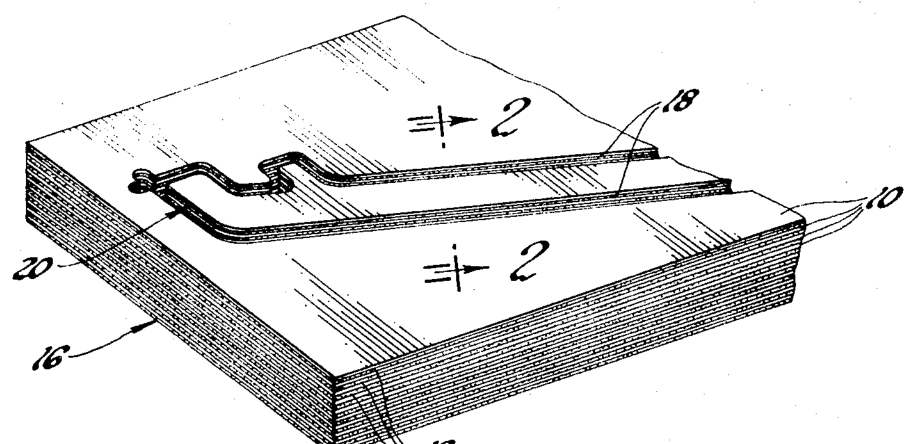
Fig. 1
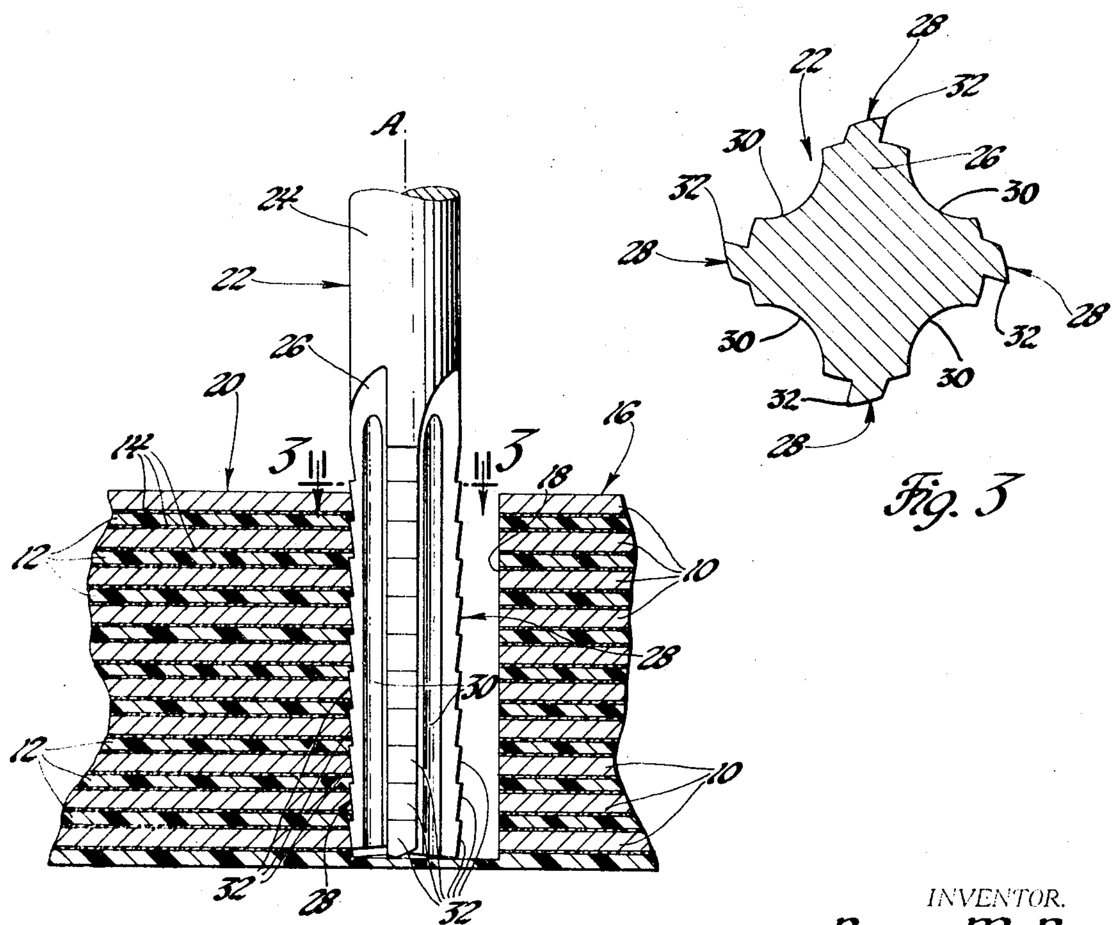
Fig. 2
Fig. 3
INVENTOR.
BY Roger M. Berg
Herbert Furman
ATTORNEY United States Patent Office 3,749,625

Patented July 31, 1973

3,749,625

MACHINING PROCESS

Roger M. Berg, Sterling Heights, Mich., assignor to General Motors Corporation, Detroit, Mich.

Filed Aug. 12, 1971, Ser. No. 171,149
Int. Cl. B23c *1/00;* B32b *31/00*
U.S. Cl. 156—250 4 Claims

ABSTRACT OF THE DISCLOSURE

A plurality of substantially planar members and a plurality of generally planar spacers are laminated to each other in an alternating relationship by a thermoplastic bonding agent. A rotatable milling cutter with a plurality of axially spaced and axially extending cutting edges along the rotational axis is positioned with this axis normal to the planar members. The cutting edges are out of square relative to a plane normal to the rotational axis and are respectively aligned with the planar members. The milling cutter is rotated and moved relative to the planar members to respectively engage the cutting edges with the planar members and simultaneously machine the edges of the planar members out of square. The laminated spacers and machined planar members are heated to allow separation of the planar members from the spacers and from each other.

BACKGROUND OF THE INVENTION

This invention relates generally to machining processes for simultaneously machining the edges of a plurality of generally planar members.

Machining processes for simultaneously machining the edges of a plurality of planar members are well known. Generally, the planar members are stacked and held in position by a fixture on the table of a milling machine. A milling cutter is mounted on the milling machine head for rotational movement about an axis normal to the planar members and includes cutting teeth whose cutting edges are at a fixed radial distance from the axis of rotation. The planar members are moved relative to the rotating milling cutter in a direction normal to the axis of rotation to move the cutting edges into engagement with the planar members and machine the edges of the planar members at right angles.

In certain instances, it is desirable and/or necessary to machine the edges of planar members somewhat out of square. For example, in the manufacture of certain vehicle front grilles, it is desirable to machine the edges of the grille blade members at approximately 7 degrees out of square to provide the edges with light reflecting characteristics giving the vehicle grille an aesthetically appealing appearance. Conventionally, the edges of the grille blade members have been individually machined in this out of square configuration. This individual machining of the grille blade members, of course, is more expensive and time consuming than would be the case if a plurality of the blade members were machined simultaneously.

SUMMARY OF THE INVENTION

This invention provides an improved machining process for simultaneously machining the edges of a plurality of planar members out of square.

In the preferred practice of the invention, a plurality of substantially planar members and a plurality of generally planar spacers are laminated in an alternating relationship by a thermoplastic bonding agent. A milling cutter is rotated about an axis generally normal to the planar members and includes a plurality of axially spaced and axially extending cutting edges along the rotational axis. The cutting edges are out of square relative to a plane normal to the rotational axis and are respectively aligned with the planar members such that relative movement between the rotating cutter and the planar members engages the cutting edges with the respective planar members and simultaneously machines the edges of the planar members out of square. The laminated spacers and planar members are heated to allow separation of the machined planar members from the spacers and from each other.

Accordingly, one feature of this invention is that it provides an improved machining process for simultaneously machining the edges of a plurality of planar members out of square. Another feature of this invention is that the planar members are machined by respective cutting edges of a milling cutter and are spaced relative to each other to allow for lack of uniformity in the thicknesses of the members and prevent the possibility of the planar members being machined by cutting edges of the milling cutter respective to the adjacent planar members. A further feature of this invention is that the planar members and a plurality of generally planar spacers are laminated in an alternating relationship by a thermoplastic bonding agent such that a heating operation allows separation of the machined planar members from the spacers and from each other. Yet another feature of this invention is that it uses a milling cutter including a shank portion adaptable for mounting the milling cutter for movement about the rotational axis and a body portion having a plurality of axially spaced and axially extending cutting edges along the rotational axis, with the cutting edges out of square relative to a plane normal to the rotational axis and defining respective annular surfaces uninterrupted by any surfaces defined by any other portion of the rotating milling cutter to allow the simultaneous out of square milling operation on the edges of the planar members.

BRIEF DESCRIPTION OF THE DRAWINGS

An understanding of the above detailed features and other features of this invention is apparent from the following description of the preferred practice of the invention and the drawings in which:

FIG. 1 is a perspective view of laminated planar members that have been machined by a conventional milling cutter to form the general configuration of vehicle grille blade members;

FIG. 2 is an enlarged sectional view of the planar members taken generally along line 2—2 of FIG. 1 and showing the planar members spaced from each other by generally planar spacers and a milling cutter with a plurality of cutting edges for simultaneously machining the edges of the planar members out of square; and FIG. 3 is an enlarged sectional view of the milling cutter taken generally along line 3—3 of FIG. 2.

PREFERRED PRACTICE OF THE INVENTION

Referring now to the drawings, a plurality of generally planar members indicated by 10 are spaced from each other by generally planar spacers 12 of a suitable machinable material. A conventional thermoplastic bonding agent 14 adheres the planar members 10 and the spacers 12 in an alternating relationship to provide what is referred to as a stack-plank generally indicated by 16. As can be seen in FIG. 1, the stack-plank 16 has been machined by a conventional milling cutter to provide slots 18 that define the outline of vehicle grille blade members as indicated generally by 20.

To machine the edges of the planar members 10 with a slightly out of square configuration relative to the planes of the members, a milling cutter 22 shown in FIGS. 2 and 3 is utilized. The milling cutter 22 includes a shank portion 24 for mounting within the conventional chuck of a milling machine head to support the milling cutter for rotational movement about an axis A. The milling cutter 22 also includes a body portion 26 that supports four circumferentially spaced axially extending rows of cutting teeth generally indicated by 28. Between the rows of cutting teeth, body portion 26 includes axially extending flutes 30 allowing removal of machined chips during milling. Each of the rows of cutting teeth 28 includes respective axially spaced and axially extending cutting edges 32 along the axis A and the cutting edges are slightly out of square relative to a plane normal to this axis. During rotation of the milling cutter 22 about axis A, the axially aligned sets of cutting edges 32 define respective frustoconical surfaces that are uninterrupted by any other portion of the rotating milling cutter.

To commence the milling operation, the stack-plank 16 is located on the table of the milling machine with the planar members 10 normal to axis A of milling cutter 22. Either the milling machine head or table is then adjusted to align the respective sets of axially spaced cutting edges 32 with the planar members 10 as in FIG. 2. The milling cutter 22 is then rotated and the stack-plank 16 is slid along the table to engage the rotating cutting edges 32 with the respective planar members 10 and to machine the edges of the planar members slightly out of square. Due to the separation of the planar members 10 by the spacers 12, a lack of uniformity in the thicknesses of the planar members will not result in the upper or lower portions of cutting edges 32 machining the adjacent planar members and thus destroying the desired configuration. Also, since the cutting edges 32 mill the spacers 12 between the planar members 10, the total length of the rows of cutting teeth 28 engage the stack-plank 16 during the operation and tool noise is reduced.

After the milling operation, it is possible to utilize a buffing wheel to simultaneously buff the machined grille blade members. Subsequently, the laminated grille blade members and the interposed spacers 12 are heated such that the thermoplastic bonding agent 14 allows separation of the finished grille blade members from the spacers and from each other.

The invention thus provides an improved machining process.

What is claimed is:

1. A machining process comprising, positioning a plurality of substantially planar members in generally parallel relationship relative to each other, providing a rotatable milling cutter having a plurality of axially spaced and axially extending cutting edges along the rotational axis with the cutting edges out of square relative to a plane normal to the rotational axis, moving the rotating milling cutter relative to the planar members with the rotational axis generally normal thereto to respectively engage the cutting edges with the planar members and simultaneously machine the edges of the planar members out of square, and separating the machined planar members from each other.

2. A machining process comprising, positioning a plurality of substantially planar members in spaced generally parallel relationship relative to each other, providing a rotatable milling cutter having a plurality of axially spaced and axially extending cutting edges along the rotational axis with the cutting edges out of square relative to a plane normal to the rotational axis, moving the rotating milling cutter relative to the planar members with the rotational axis generally normal thereto to respectively engage the cutting edges with the planar members and simultaneously machine the edges of the planar members out of square, and separating the machined planar members from each other.

3. A machining process comprising, laminating a plurality of substantially planar members and a plurality of generally planar spacers to each other in an alternating relationship, providing a rotatable milling cutter having a plurality of axially spaced and axially extending cutting edges along the rotational axis with the cutting edges out of square relative to a plane normal to the rotational axis, moving the rotating milling cutter relative to the planar members with the rotational axis generally normal thereto to respectively engage the cutting edges with the planar members and simultaneously machine the edges of the planar members out of square, and separating the machined planar members from each other.

4. A machining process comprising, laminating a plurality of substantially planar members and a plurality of generally planar spacers in an alternating relationship with a thermoplastic bonding agent, providing a rotatable milling cutter having a plurality of axially spaced and axially extending cutting edges along the rotational axis with the cutting edges out of square relative to a plane normal to the rotational axis, moving the rotating milling cutter relative to the planar members with the rotational axis generally normal thereto to respectively engage the cutting edges with the planar members and simultaneously machine the edges of the planar members out of square, and heating the laminated spacers and planar members to allow separation of the machined planar members from the spacers and from each other.

References Cited

UNITED STATES PATENTS

| | | | |
|---|---|---|---|
| 1,938,394 | 12/1933 | Lyon | 144—240 |
| 3,615,094 | 10/1971 | Conner | 156—257 |

FOREIGN PATENTS

| | | | |
|---|---|---|---|
| 541,712 | 10/1955 | Belgium | 90—11 C |

DOUGLAS J. DRUMMOND, Primary Examiner

U.S. Cl. X.R.

90—11 C; 144—323